UNITED STATES PATENT OFFICE.

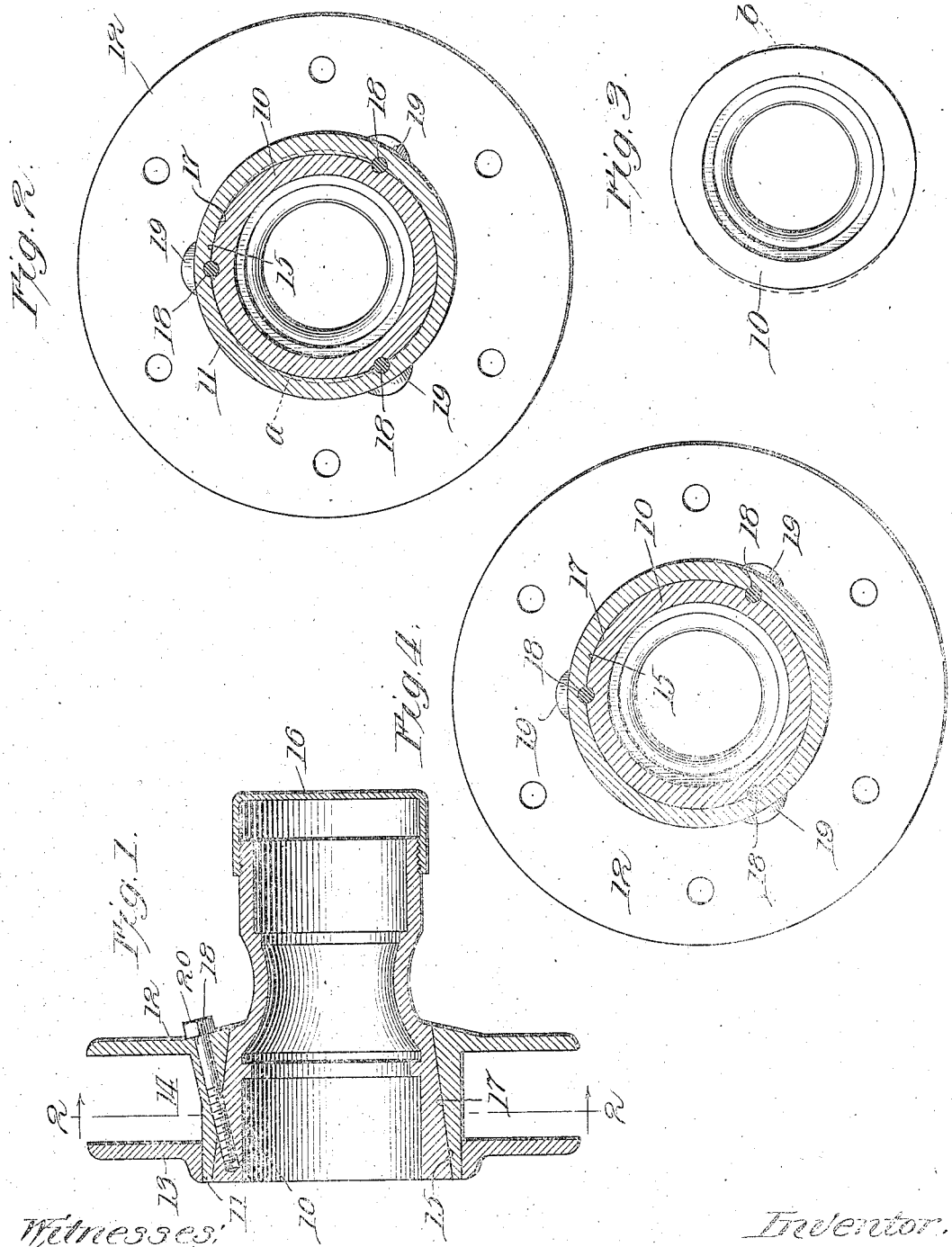

THOMAS I. DUFFY, OF CHICAGO, ILLINOIS, ASSIGNOR TO HENRY ELLSWORTH AND ALBERT E. CROSS, BOTH OF CHICAGO, ILLINOIS, COPARTNERS DOING BUSINESS UNDER THE FIRM-NAME OF ELLSWORTH & CROSS.

DEMOUNTABLE WHEEL.

1,076,557.

Specification of Letters Patent.    Patented Oct. 21, 1913.

Application filed July 1, 1910.   Serial No. 569,846.

*To all whom it may concern:*

Be it known that I, THOMAS I. DUFFY, a citizen of the United States, and a resident of Chicago, in the county of Cook and State of Illinois, have invented certain new and useful Improvements in Demountable Wheels; and I do hereby declare that the following is a full, clear, and exact description thereof, reference being had to the accompanying drawings, and to the characters of reference marked thereon, which form a part of this specification.

This invention relates to improvements in hubs for demountable wheels, more especially adapted to automobile uses, of that kind shown in my prior application for United States Letters Patent, Serial Number 558,807, filed May 2nd, 1910. Said hub embraces separately formed tubular members or shells, the outer one of which carries the spokes, wheel rim and pneumatic or other tire, and said outer member is adapted to be removably fitted over the inner member which carries the anti-friction bearings of the wheel; the arrangement being such as to permit the principal part of the wheel which carries the tire to be readily removed and replaced by another like part-wheel having thereon a perfect tire so as to quickly substitute a perfect tire for a defective tire. The part-wheel, which carries the tire, is adapted to be carried in any suitable manner on the car in the manner of a spare wheel, to be substituted to replace a defective tire when occasion requires. A convenient carrying device for the part-wheel consists of a short stud fixed to any suitable part of the car of a size to extend through and closely fit in the outer hub member and provided at its end with a nut to hold the part-wheel thereon.

Among the objects of the invention is to provide an economical and simple form of construction of a wheel hub of this character, and the invention consists in the matters hereinafter set forth and more particularly pointed out in the appended claims.

In the drawings, Figure 1 is an axial section of a demountable hub embodying my invention. Fig. 2 is a cross section on line 2—2 of Fig. 1. Fig. 3 is a rear elevation of the inner member of the hub. Fig. 4 is a section similar to Fig. 2, showing a modification.

The hub comprises as its principal elements an inner shell or member 10 which is interiorly fashioned to receive the anti-friction bearings of the hub, (not shown) and an outer shell or member 11 which is fitted over the inner member and is arranged to carry the spokes, rim and tire of the wheel (not shown). The outer member is provided with an integral flange 12, between which and a slip flange 13, fitted over the outer member, is formed an annular groove 14 to receive the tenons of the wheel spokes. Said flanges are apertured to receive the bolts by which to clamp the spokes to the hub. The rear end of the inner member is formed with an exterior taper 15, said inner member being made largest at its rear end. The inner member is elongated beyond the outer member to provide a space to receive the end of the axle and the anti-friction bearings and is exteriorly screw-threaded at its outer end to receive a dust cap 16 which closes the outer end of the hub. The outer member 11 is provided with an interior taper 17, complemental to and adapted to interfit with the exterior taper 15 of the inner member. The outer end of the inner member is made of such diameter as to permit the outer member to be passed thereover to fit the tapered outer member over the tapered inner member. The said members are forced together to wedge the complemental tapered surfaces thereof tightly upon each other by means of the screw bolts 18, 18 which extend through openings in the said outer member at the base of the flange 12 and engage alined screw-threaded openings in the rear thickened portion of the inner member. The said bolts 18 are inclined to the axis of the hub so as to pass diagonally through the interfitting inner and outer shells or members of the hub. In order to provide stock in which the bolt holes of the outer member may be formed, the said outer member may be thickened at the points 19, 19. In the manufacture of the hub the bolt openings for the bolts 18 are drilled after the tapered members have been fitted together and brought to their final seating positions one on the other. In this manner accurate registration of the bolt openings of the two parts is assured. By engagement of the screw threads of the bolts with the screw threads of the bolt holes of the inner member, and of the heads 20 of said bolts with the outer face of the flange 12, the said outer member is pressed upon the inner member to wedge the tapered surfaces of said members into close interfitting engagement. The said bolts 18 constitute, not only means for wedging the tapered surfaces of the members together, but also afford interlocking means to lock the outer member from rotation on the inner member. The said inner and outer members may be additionally interlocked against relative rotation by making the tapered portions of the members slightly oval in cross section, as set forth in my aforesaid prior application, or by otherwise varying the cross section of said tapered portions from a true circle. The dotted circles $a$, $b$ on Figs. 2 and 3 of the drawing indicate the divergence of the cross section of the tapered portions from a true circle. In some cases the said tapered portions of the inner and outer hub members may be made circular in cross section, as shown in Fig. 4, and the bolts 18, with or without other keying means, may be relied upon to effect the interlocking of the hub members against rotation.

In the use of a wheel provided with my improved demountable hub, when it is desired to substitute a part-wheel with a perfect pneumatic tire for a part-wheel having thereon an injured or worn tire, the locking bolts 18 are first removed and the outer member 11 of the hub and the parts of the wheel carried thereby are thereafter forced outwardly over the inner member. When the outer member of the hub and the part-wheel carried thereby are thus removed, the tapered outer member of a duplicate part wheel is fitted to the inner member, the bolt openings of the members brought to register and the bolts 18 inserted in place and screwed inwardly to clamp the members together.

The hub described may be made at comparatively small expense and provides means for readily replacing a blown out or punctured tire with a perfect tire.

It is obvious that the details of the hub shown are capable of slight variations within the scope and spirit of my invention, and the invention is not limited to the exact structural details illustrated, except as hereinafter made the subject of specific claims.

I claim as my invention:—

1. In a demountable wheel, a hub comprising an inner member formed to receive an axle and bearings, and provided with an exterior taper, an outer or socket member fitted thereover and removable endwise therefrom in demounting the wheel, and provided with front and rear spoke flanges and with an interior tapered surface to engage throughout its length the exterior taper of the inner member, and a plurality of screw-threaded bolts having headed ends located radially exterior to the inner periphery of the said outer member, and extending through openings in said outer member and engaging screw-threaded openings in the inner member, said bolts being arranged obliquely to the axes of the hub members and crossing at a long angle the meeting tapered faces of the inner and outer members, whereby the resisting areas of said bolts against shearing stress is increased beyond the normal diameters of said bolts.

2. In a demountable wheel, a hub comprising an inner member formed to receive an axle and bearings, and provided with an exterior taper, an outer or socket member fitted thereover and removable endwise therefrom in demounting the wheel, and provided with front and rear spoke flanges and with an interior tapered surface to engage throughout its length the exterior taper of the inner member, and a plurality of screw-threaded bolts having headed ends located radially exterior to the inner periphery of the said outer member, and extending through openings in said outer member and engaging screw-threaded openings in the inner member, said bolts being arranged obliquely to the axes of the hub members and crossing at a long angle the meeting tapered faces of the inner and outer members, whereby the resisting areas of said bolts against shearing stress is increased beyond the normal diameter of said bolts, the said outer member being thickened in its part through which the bolts extend, for the purpose set forth.

In testimony, that I claim the foregoing as my invention I affix my signature in the presence of two witnesses, this 28th day of June A. D. 1910.

THOMAS I. DUFFY.

Witnesses:
W. L. HALL,
WILLIAM GOLDBERGER.